(12) United States Patent
Mitchell

(10) Patent No.: US 10,107,684 B1
(45) Date of Patent: Oct. 23, 2018

(54) OPTICAL SYSTEMS WITH IMPROVED SIGNAL TO NOISE RATIO

(71) Applicant: Wavefront Research, Inc., Bethlehem, PA (US)

(72) Inventor: Thomas A. Mitchell, Nazareth, PA (US)

(73) Assignee: Wavefront Research, Inc., Northampton, PA (US)

( * ) Notice: Subject to any disclaimer, the term of this patent is extended or adjusted under 35 U.S.C. 154(b) by 0 days.

(21) Appl. No.: 15/824,407

(22) Filed: Nov. 28, 2017

Related U.S. Application Data

(60) Provisional application No. 62/427,459, filed on Nov. 29, 2016.

(51) Int. Cl.
| | |
|---|---|
| *G01J 3/28* | (2006.01) |
| *G01J 3/18* | (2006.01) |
| *G01J 3/14* | (2006.01) |
| *G01J 3/04* | (2006.01) |
| *G01J 3/02* | (2006.01) |
| *G01J 3/42* | (2006.01) |

(52) U.S. Cl.
CPC .............. *G01J 3/18* (2013.01); *G01J 3/0208* (2013.01); *G01J 3/04* (2013.01); *G01J 3/14* (2013.01); *G01J 3/42* (2013.01); *G01J 2003/425* (2013.01)

(58) Field of Classification Search
CPC ........ G01J 3/02; G01J 3/04; G01J 3/12; G01J 3/14; G01J 3/28; G01J 3/18; G01J 3/42; G02B 27/10; G02B 27/141; G02B 27/30
See application file for complete search history.

(56) References Cited

U.S. PATENT DOCUMENTS

2004/0227940 A1* 11/2004 Mitchell ................... G01J 3/18
356/328

\* cited by examiner

*Primary Examiner* — Abdullahi Nur
(74) *Attorney, Agent, or Firm* — Burns & Levinson LLP; Orlando Lopez

(57) ABSTRACT

Systems and methods for increasing the overall throughput, decreasing the overall background radiation, or a combination thereof for imaging systems.

30 Claims, 11 Drawing Sheets

OPTICAL SYSTEMS WITH IMPROVED SIGNAL TO NOISE RATIO

CROSS REFERENCE TO RELATED APPLICATIONS

This application claims priority from U.S. Provisional Patent Application Ser. No. 62/427,459, filed Nov. 29, 2016, entitled OPTICAL SYSTEMS WITH IMPROVED SIGNAL TO NOISE RATIO and incorporated herein by reference in its entirety for all purposes.

STATEMENT OF GOVERNMENT INTEREST

This invention was made with U.S. Government support from the U.S. Army under contract W909MY-12-D-0008/0013. The U.S. Government has certain rights in the invention.

BACKGROUND

These teachings relate to optical designs, which provide reduced unwanted background radiation, increased signal throughput, or a combination of both.

As detecting elements become smaller, the size of the associated slit elements in imaging spectrometer designs typically become smaller. With this decreased size, the effects of the diffraction of light become more significant, leading to the leakage of unwanted background radiation from outside the geometric rays to pass through to the detecting element, as well as leading to the loss of signal radiation that is diffracted outside of the geometric ray bundle and vignette by the optical elements or stop of the system.

This effect can be quite significant, particularly in infrared systems where unwanted background radiation that is not shielded from the detecting element can prematurely fill the electron wells of photonic detecting elements, or mask the true temperature of objects in the scene in the case of pyroelectric detecting elements. In systems where radiometric sensitivity or accuracy is concerned, the impact of these diffraction effects can be intolerable.

For example, consider some applications of hyperspectral imaging in which it is desirable to have a spectrometer that is intended to identify targets by their spectral signatures in the infrared portion of the electromagnetic spectrum, but must also be very small size and mass so that the system can be transported in an unmanned aerial vehicles (UAV) or be man-portable. These sensors may typically have detecting elements and associated slit apertures whose dimensions are on the same order as the wavelength of the light they are intended to detect, in which case the effects of diffraction are substantial, and can easily reach diffraction angles of 30 degrees or more. If accurate radiometric measurement of the targets is necessary, then this diffraction can mask or hide the target from detection or even introduce false alarms detections. Additionally, the loss of wanted signal from the target due to diffraction can reduce the sensitivity of the sensor, allowing potential targets and threats to go unidentified.

There is a need for optical designs that increasing the overall throughput, decrease the overall background radiation, or a combination thereof.

SUMMARY

The embodiments of the present teachings provide method for increasing the overall throughput, decreasing the overall background radiation, or a combination thereof for imaging systems.

More specifically, the embodiments disclose and describe an imaging system that increases the overall throughput of the system by imaging light from a given scene that is typically lost due to diffraction in current imaging systems. The embodiments further disclose and describe an imaging spectrometer system that decreased the overall background radiation in the system by blocking radiation from unwanted sources that are typically imaged by the system due to diffraction in current imaging systems.

For a better understanding of the present teachings, together with other and further objects thereof, reference is made to the accompanying drawings and detailed description.

DETAILED DESCRIPTION

The embodiments of the present teachings provide method for increasing the overall throughput, decreasing the overall background radiation, or a combination thereof for imaging systems.

By introducing an optical element that blocks or shields unwanted diffracted background radiation from reaching detecting element, the radiometric accuracy of the sensor can be significantly improved. Additionally, modifications to the optical design of the spectrometer can provide a means to allow a larger portion of the diffracted scene radiation to pass through to the detecting element unvignetted.

Geometric optics would teach that there is typically only one optical stop in an optical system, the effects of diffraction at the slit aperture in an imaging spectrometer can be addressed by considering the optical system to have two optical stops, one on either side of the diffracting element. One of these stops can be used to block unwanted background radiation while the other one can by sized appropriately to capture a larger amount of the diffracted scene radiation that would ordinarily be lost.

Figure 1:
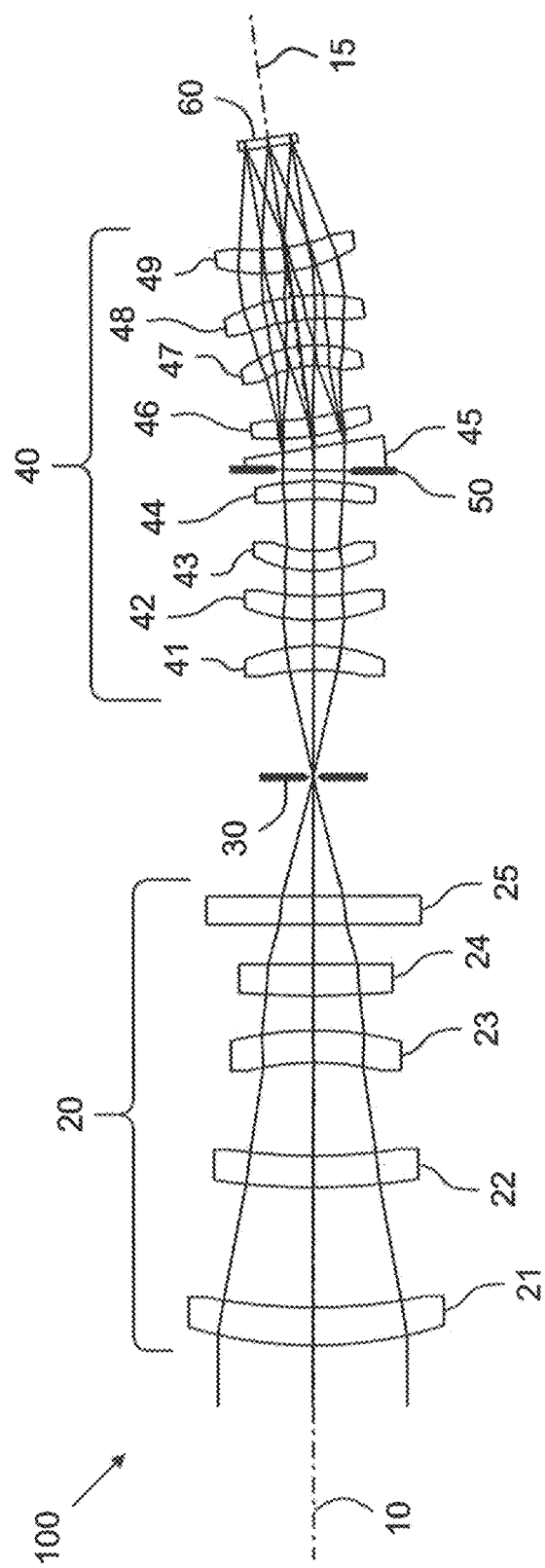
FIG. 1 is a schematic view of a hyperspectral imaging optical system, taken along its optical axis in the plane parallel to the direction of dispersion.

Reference is made to FIG. 1, which is a schematic view of an imaging spectrometer system 100 taken along its optical axes 10 and 15. In operation, electromagnetic radiation, typically in the ultraviolet, visible, and/or infrared bands, hereinafter referred to generally as light, emitted or reflected by a given object, either real or virtual, hereinafter referred to generally as the source (not shown), is incident onto an optical imaging system 20, in this embodiment made up of, but not limited to, four refractive elements 21, 22, 23, and 24, and a refractive window 25, which is capable of substantially receiving a portion of the light from the source. The light is then substantially focused onto a focus position (hereinafter also referred to as an image plane, which is typically planar, but without loss of generality may also be a curved or other non-planar surface) of a sampling aperture, typically a slit or other method of extracting a line image, (hereinafter also referred to as a slit element, but without loss of generality may be any form of sampling aperture, either reflective, refractive, open, or other type of architecture) 30, which is capable of substantially receiving the light from the optical imaging system 20.

Light transmitted by the slit element 30 is substantially collimated through a first portion of an optical spectrometer system 40, in this embodiment made up of, but not limited to, four refractive elements 41, 42, 43, and 44, onto a refractive dispersing element or any method of angularly separating light energy according to its wavelength, hereinafter referred to generally as a dispersing element 45, which is optically disposed substantially proximate to an optical stop 50 and is substantially capable of receiving a portion of the light from the first portion of the optical spectrometer 40. This dispersed light is then substantially imaged by a second portion of the optical spectrometer system 40, in this embodiment made up of, but not limited to, four refractive elements 46, 47, 48, and 49, onto a CCD array, phosphorescent screen, photographic film, microbolometer array, or other means of detecting light energy, hereinafter referred to generally as a detecting element 70, which is substantially capable of receiving a portion of the light from the second portion of the optical spectrometer system 40.

Figure 2:
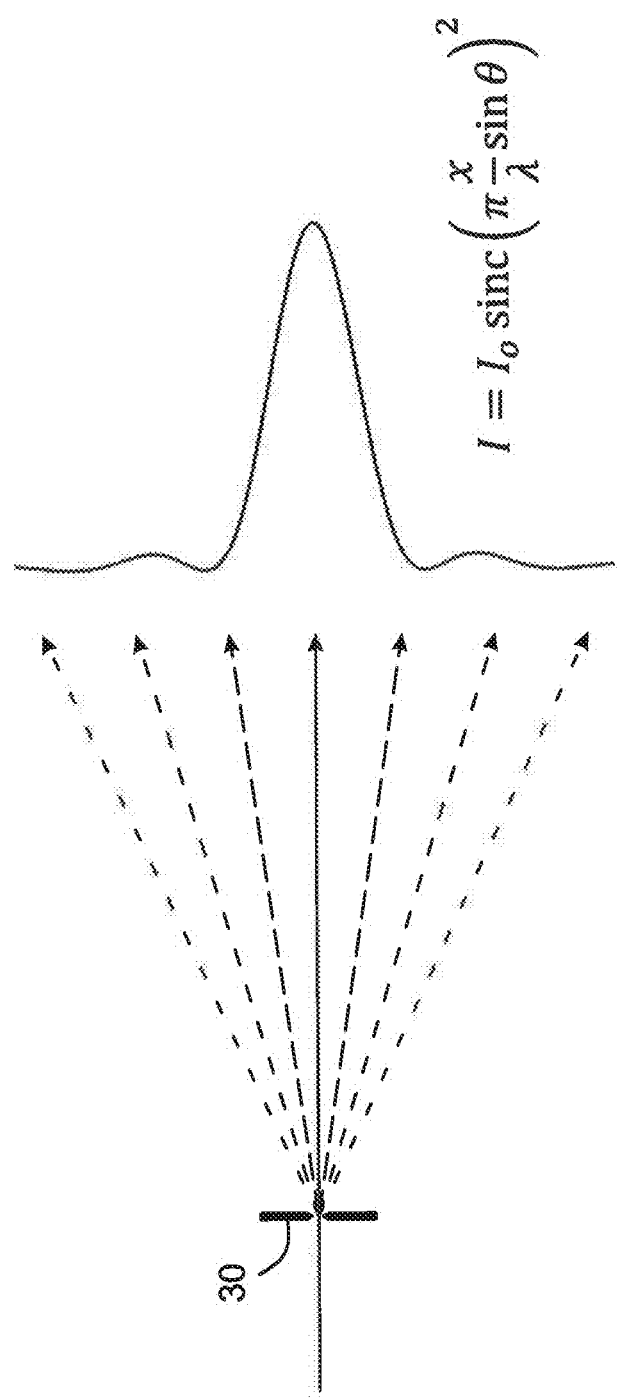
FIG. 2 illustrates the diffraction of light passing through a slit aperture.

Reference is made to FIG. 2, which is a schematic view of the slit element 30 of the imaging spectrometer system 100 illustrated in FIG. 1, and illustrates the diffraction of light passing through the slit aperture (described in Eugene Hecht, "Optics", Second Edition, Addison-Wesley Publishing Company, Reading, Mass., 1987, pp. 401-406) Light transmitted by the slit element 30 undergoes diffraction substantially according to the mathematical sinc( )$^2$ function, causing the transmitted light to diverge away from the incident beam trajectory as it passes through the slit element 30.

Figure 3:
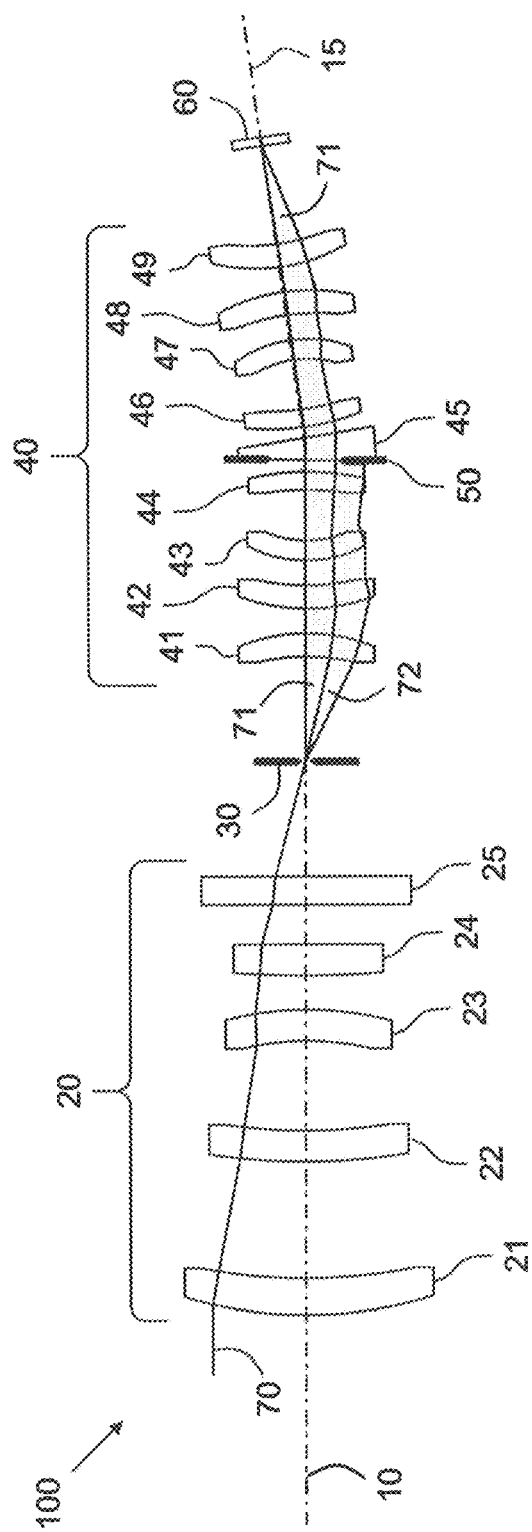
FIG. 3 is a schematic view of the hyperspectral imaging optical system of FIG. 1, taken along its optical axis in the plane parallel to the direction of dispersion and illustrating diffraction at the slit.

Reference is made to FIG. 3, which is a schematic view of the imaging spectrometer system 100 taken along its optical axes 10 and 15. In operation, light emitted or reflected by the source (not shown), is incident onto the optical imaging system 20, in this embodiment made up of, but not limited to, four refractive elements 21, 22, 23, and 24, and a refractive window 25, which is capable of substantially receiving a portion of the light from the source. The light is then substantially focused onto the slit element 30, which is capable of substantially receiving the light from the optical imaging system 20. Light transmitted by the slit element 30 is substantially diffracted by slit element 30 and collimated through a first portion of an optical spectrometer system 40, in this embodiment made up of, but not limited to, four refractive elements 41, 42, 43, and 44, onto a dispersing element 45, which is optically disposed substantially proximate to an optical stop 50 and is substantially capable of receiving a portion of the light from the first portion of the optical spectrometer 40. A first portion of the diffracted collimated light 71 is substantially transmitted by the optical stop 50, and is then substantially imaged by a second portion of the optical spectrometer system 40, in this embodiment made up of, but not limited to, four refractive elements 46, 47, 48, and 49, onto a detecting element 60, which is substantially capable of receiving a portion of the light from the second portion of the optical spectrometer system 40. A second portion of the diffracted collimated light 72 is substantially blocked by the optical stop 50 and is substantially not imaged by the second portion of the optical spectrometer system 40 onto the detecting element 60. This blocked second portion of the light results in a loss in the total throughput of the imaging spectrometer system 100 substantially due to the diffraction of the light at the slit element 30.

Figure 4:
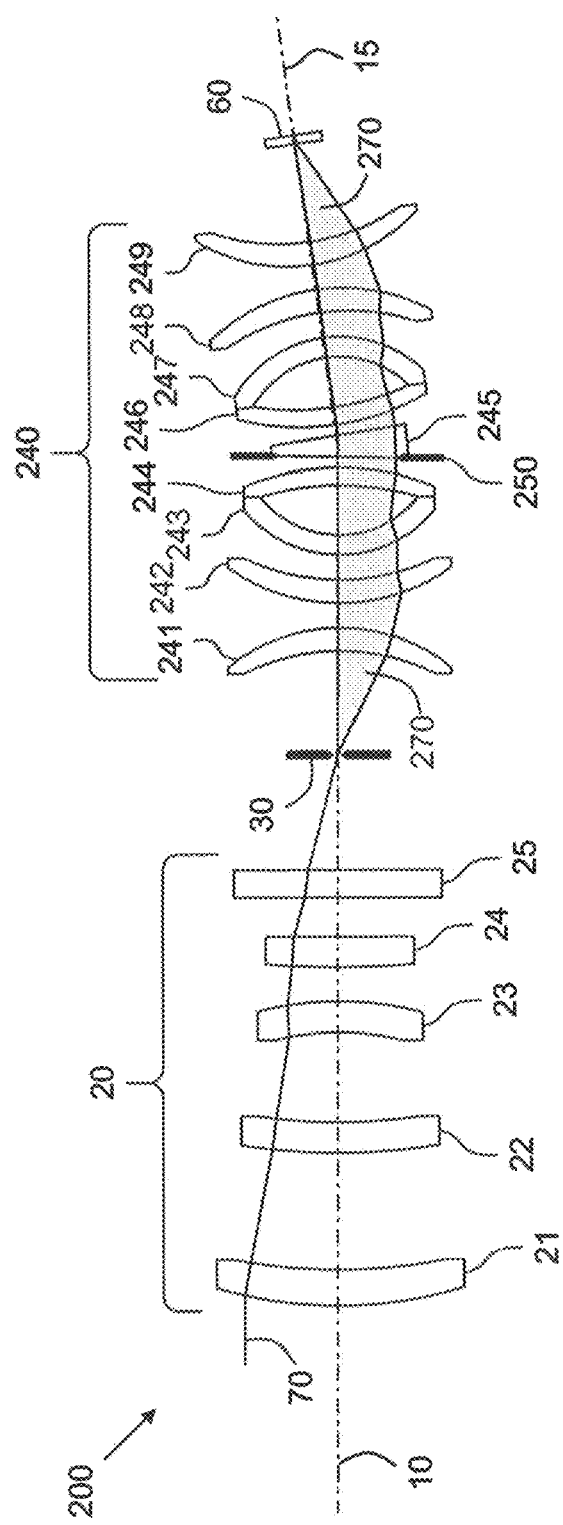
FIG. 4 is a schematic view of an embodiment of the present teachings, taken along its optical axis in the plane parallel to the direction of dispersion.

Reference is made to FIG. 4, which is a schematic view of an embodiment of the present teachings 200 taken along its optical axes 10 and 15. In operation, light emitted or reflected by the source (not shown), is incident onto the optical imaging system 20, in this embodiment made up of, but not limited to, four refractive elements 21, 22, 23, and 24, and a refractive window 25, which is capable of substantially receiving a portion of the light from the source. The light is then substantially focused onto the slit element 30, which is capable of substantially receiving the light from the optical imaging system 20. Light transmitted by the slit element 30 is substantially diffracted by slit element 30 and collimated through a first portion of an optical spectrometer system 240, in this embodiment made up of, but not limited to, four refractive elements 241, 242, 243, and 244, onto a dispersing element 245, which is optically disposed substantially proximate to an optical stop 250 and is substantially capable of receiving a portion of the light from the first portion of the optical spectrometer 240. The optical stop 250 is substantially oversized relative to the optical speed of the optical imaging system 20, such that a substantial portion of the diffracted collimated light 270 is substantially transmitted by the optical stop 250, and is then substantially imaged by a second portion of the optical spectrometer system 240, in this embodiment made up of, but not limited to, four refractive elements 246, 247, 248, and 249, onto a detecting element 60, which is substantially capable of receiving a portion of the light from the second portion of the optical spectrometer system 240. The optical elements of the optical spectrometer 240, in this embodiment made up of, but not limited to, refractive elements 241, 242, 243, 244, 246, 247, 248, and 249 are sized appropriately to substantially transmit the portion of the diffracted light 270 that is substantially transmitted by the optical stop 250. This substantially larger transmitted portion of the diffracted light 270 results in an increase in the total throughput of the imaging spectrometer system 100 that would otherwise be lost due to diffraction of the light at the slit element 30.

Figure 5:
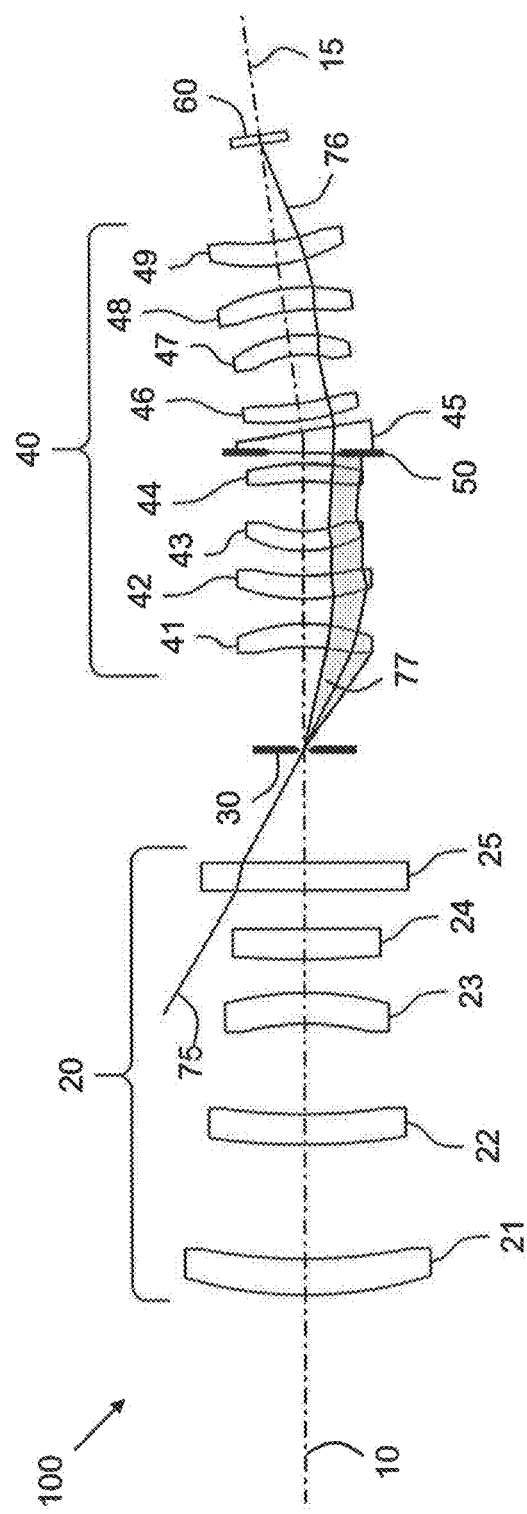
FIG. 5 is a schematic view of the hyperspectral imaging optical system of FIG. 1, taken along its optical axis in the plane parallel to the direction of dispersion and illustrating diffraction at the slit.

Reference is made to FIG. 5, which is a schematic view of the imaging spectrometer system 100 taken along its optical axes 10 and 15. In operation, unwanted light 75 may be substantially directed towards the slit element 30, which is capable of substantially receiving the unwanted light. A portion of this unwanted light transmitted by the slit element 30 is substantially diffracted by slit element 30 and collimated through a first portion of an optical spectrometer system 40, in this embodiment made up of, but not limited to, four refractive elements 41, 42, 43, and 44, onto a dispersing element 45, which is optically disposed substantially proximate to an optical stop 50 and is substantially capable of receiving a portion of the light from the first portion of the optical spectrometer 40. A first portion of the diffracted collimated light 76 is substantially transmitted by the optical stop 50, and is then substantially imaged by a second portion of the optical spectrometer system 40, in this embodiment made up of, but not limited to, four refractive elements 46, 47, 48, and 49, onto a detecting element 60, which is substantially capable of receiving a portion of the light from the second portion of the optical spectrometer system 40. This transmitted first portion of the light results in an increase in the unwanted background radiation in the imaging spectrometer system 100 substantially due to the diffraction of the unwanted light 75 at the slit element 30. A second portion of the diffracted collimated light 77 is substantially blocked by the optical stop 50 and is substantially not imaged by the second portion of the optical spectrometer system 40 onto the detecting element 60.

Figure 6:
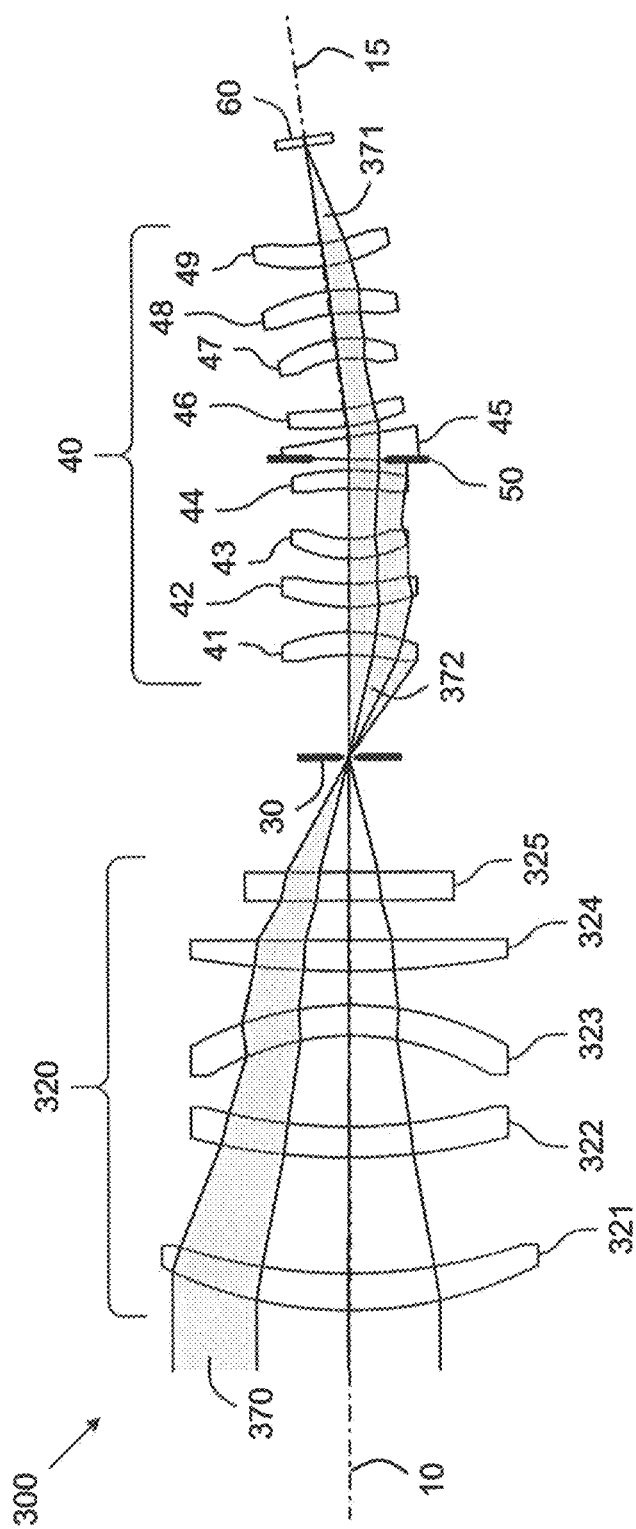
FIG. 6 is a schematic view of a further embodiment of the present teachings, taken along its optical axis in the plane parallel to the direction of dispersion.

Reference is made to FIG. 6, which is a schematic view of an embodiment of the present teachings 300 taken along its optical axes 10 and 15. In operation, light emitted or reflected by the source (not shown), is incident onto the optical imaging system 320, in this embodiment made up of, but not limited to, four refractive elements 321, 322, 323, and 324, and a refractive window 325, which is capable of substantially receiving a first portion of the light from the source. This first portion of the light is then substantially focused onto the slit element 30, which is capable of substantially receiving the light from the optical imaging system 20. Light transmitted by the slit element 30 is substantially diffracted by slit element 30 and collimated through a first portion of an optical spectrometer system 40, in this embodiment made up of, but not limited to, four refractive elements 41, 42, 43, and 44, onto a dispersing element 45, which is optically disposed substantially proximate to an optical stop 50 and is substantially capable of receiving a portion of the light from the first portion of the optical spectrometer 40. The optical elements of the optical imaging system 320, in this embodiment made up of, but not limited to, refractive elements 321, 322, 323, 324, and refractive window 325, are sized appropriately to substantially transmit a second portion of the light 372 from the source that would normally be substantially blocked by the optical stop 50. A portion of the light 372 from the source that is substantially diffracted 371 by the slit element 30 is substantially transmitted by the optical stop 50, and is then substantially imaged by a second portion of the optical spectrometer system 40, in this embodiment made up of, but not limited to, four refractive elements 46, 47, 48, and 49, onto a detecting element 60, which is substantially capable of receiving a portion of the light from the second portion of the optical spectrometer system 40. This transmitted portion 371 of the diffracted light from the second portion of the light 372 from the source results in an increase in the total throughput of the imaging spectrometer system 100 that would otherwise not be transmitted by the optical spectrometer system 40.

Figure 7:
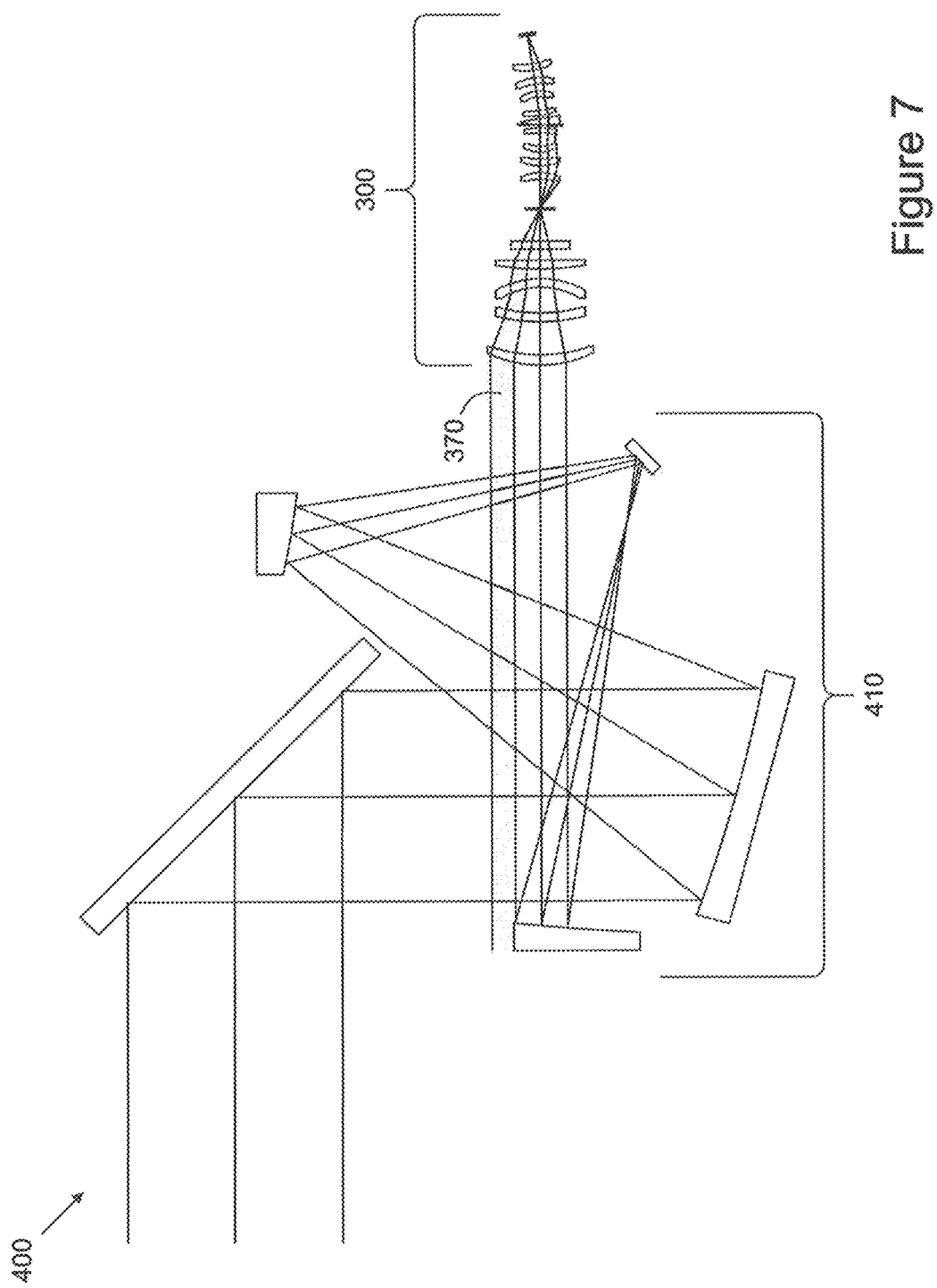
FIG. 7 is a schematic view of a hyperspectral imaging optical system, taken along its optical axis in the plane parallel to the direction of dispersion and illustrating diffraction at the slit.

Reference is made to FIG. 7, which is a schematic view of the imaging spectrometer system 400 taken along its optical axes, and is comprised of the imaging spectrometer system 300 illustrated previously in FIG. 6. In operation, light emitted or reflected by the source (not shown), is incident onto the optical imaging system 410, which is capable of substantially receiving a portion of the light from the source and capable of substantially transmitting a portion of the light to the imaging spectrometer system 300. Unwanted light 370 directed from any number of sources, including but not limited to the housings of the imaging optical system 400, other mechanical structures, or other sources, hereinafter referred to generally as unwanted sources, may be substantially directed towards the imaging spectrometer system 300, which is capable of substantially receiving the unwanted light. As described previously, a portion of this unwanted light transmitted by the imaging spectrometer system 300 may be substantially diffracted and substantially imaged onto its detecting element. This transmitted portion 370 of the light results in an increase in the unwanted background radiation in the imaging spectrometer system 400 substantially due to the diffraction of the unwanted light within the imaging spectrometer system 300.

Figure 8:
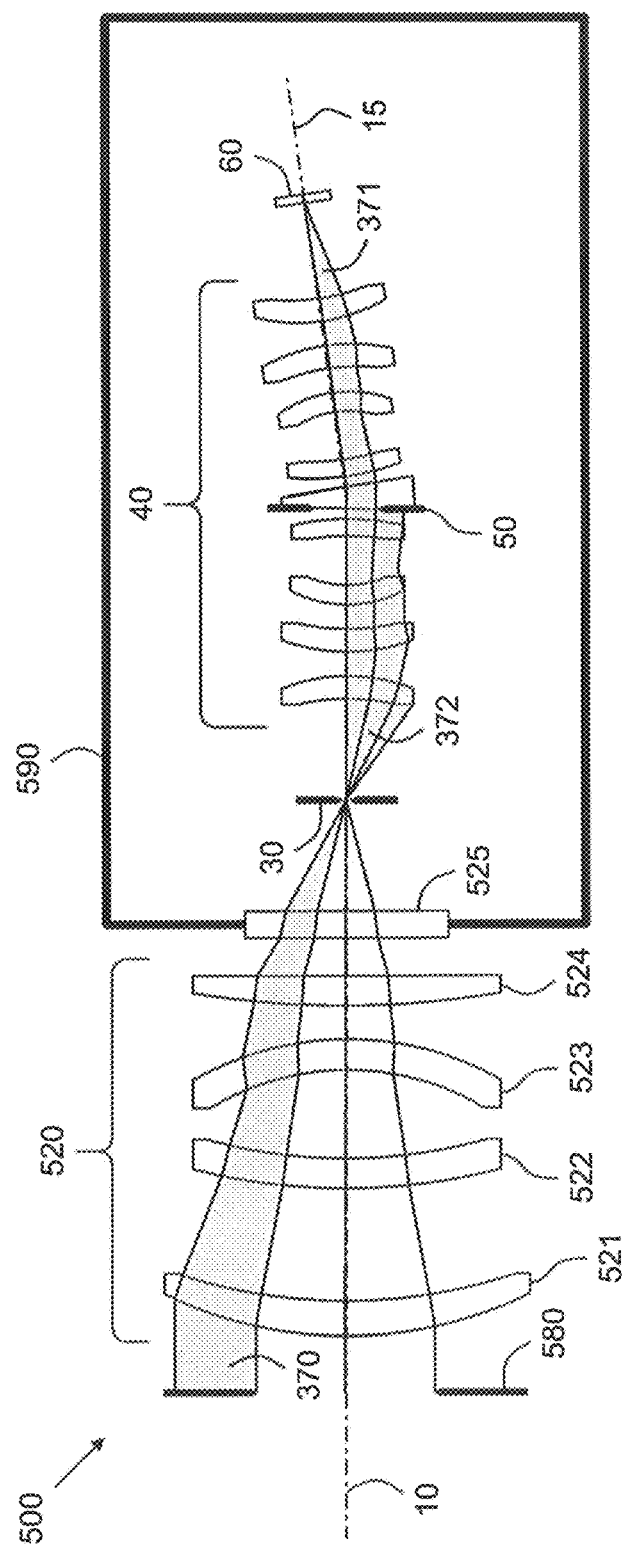
FIG. 8 is a schematic view of a further embodiment of the present teachings, taken along its optical axis in the plane parallel to the direction of dispersion.

Reference is made to FIG. 8, which is a schematic view of an embodiment of the present teachings 500 taken along its optical axes 10 and 15. In operation, light emitted or reflected by the source (not shown), is incident onto the optical imaging system 520, in this embodiment made up of, but not limited to, four refractive elements 521, 522, 523, and 524, which is capable of substantially receiving a portion of the light from the source. This light is then substantially focused through an environmental window, including but not limited to, any element that separates one environment from another, in this embodiment made up of a refractive window 525, and onto a slit element 30, which is capable of substantially receiving the light from the optical imaging system 520. An optical aperture capable of substantially transmitting a portion of the light from the source and substantially capable of blocking unwanted light from any number of sources, such as but not limited to an optical stop element, reflective shield, or other aperture, hereinafter referred to generally as a shield element, 580, in this embodiment made up of a reflective aperture, is substantially located near an entrance or exit pupil or optical stop of the optical imaging system 520, in this embodiment located near the entrance pupil of the optical imaging system 520. Light emitted or reflected by the shield element 580 is substantially transmitted by the optical imaging system 520, which is capable of substantially receiving a portion of the light from the shield element 580 and then substantially focusing the light through the environmental window 525 and onto the slit element 30. A first portion of the light 371 from the shield element is transmitted by the slit element 30 and is substantially diffracted by slit element 30 and imaged by the optical spectrometer system 40 onto a detecting element 60, which is substantially capable of receiving a portion of the light from the optical spectrometer system 40. The shield element 580 is configured to emit or reflect substantially low amounts of light relative to the source, which can be accomplished by a number of means, including but not limited to, a highly emissive or dark surface for visible wavelength applications, or a substantially cold surface for thermal wavelength applications. In this embodiment, the slit element 30, optical spectrometer system 40, and detecting element 60 are located within a substantially lower temperature environment, including but not limited those produced by cryogenic coolers, in this embodiment consisting of the cryogenic environment of a Dewar 590 such that the radiative emissions of these elements are substantially small. The surface of the shield element 580 is substantially reflective and is optically disposed to reflect radiation emitted from these elements substantially back towards themselves. In this manner, unwanted light from outside the imaging spectrometer system 500 is blocked by the shield element 580, which only reflects substantially low radiation emitted by the contents of the cryogenic environment of the Dewar 590. As a result, the unwanted background radiation that would otherwise be diffracted by the slit element 30 is substantially reduced.

Figure 9:
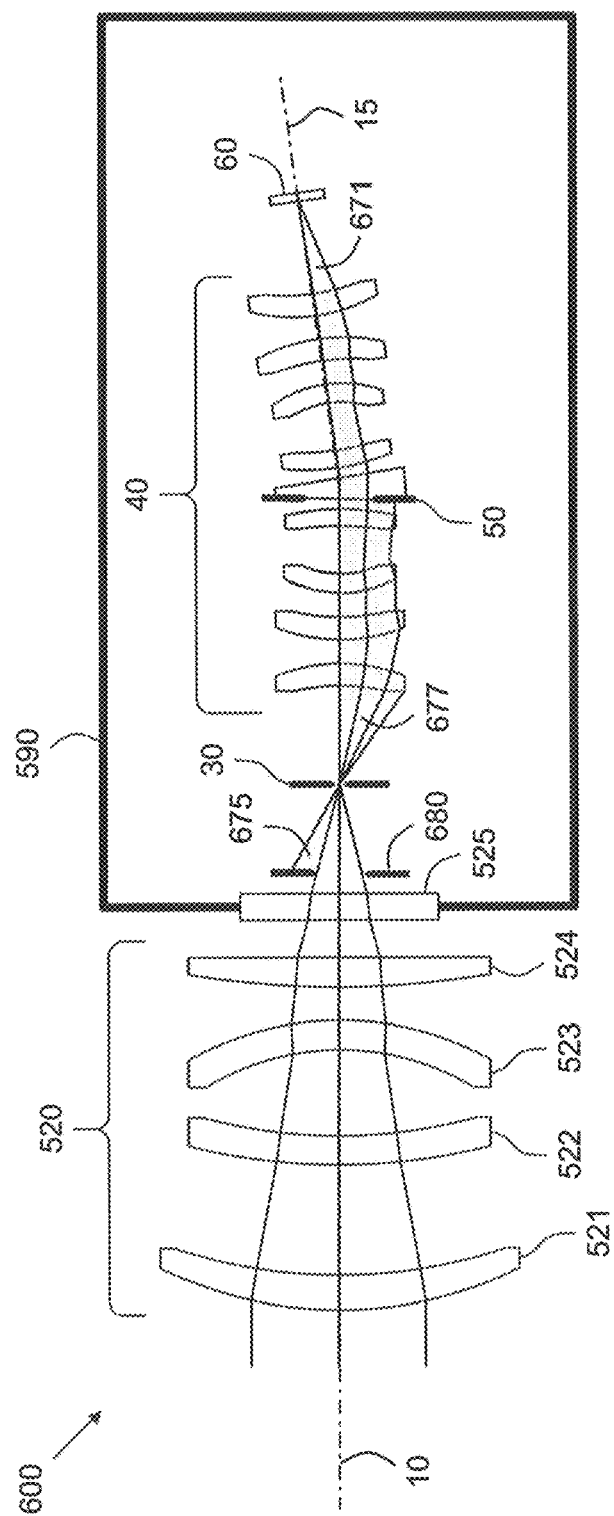
FIG. 9 is a schematic view of a further embodiment of the present teachings, taken along its optical axis in the plane parallel to the direction of dispersion.

Reference is made to FIG. 9, which is a schematic view of an embodiment of the present teachings 600 taken along its optical axes 10 and 15. In operation, light emitted or reflected by the source (not shown), is incident onto the optical imaging system 520, in this embodiment made up of, but not limited to, four refractive elements 521, 522, 523, and 524, which is capable of substantially receiving a portion of the light from the source. This light is then substantially focused through an environmental window, in this embodiment made up of, but not limited to, a refractive window 525, and onto a slit element 30, which is capable of substantially receiving the light from the optical imaging system 520. A shield element, 680, in this embodiment made up of an absorptive, or high-emissivity, aperture, is substantially located near the slit element 30 and optically disposed prior to the slit element 30. A portion of the light 675 emitted or reflected by the shield element 580 is substantially transmitted by the slit element 30 and is substantially diffracted by slit element 30 and imaged by the optical spectrometer system 40 onto a detecting element 60, which is substantially capable of receiving a portion of the light from the optical spectrometer system 40. In this embodiment, the shield element 680, slit element 30, optical spectrometer system 40, and detecting element 60 are located within a cryogenic environment of a Dewar 590 such that the radiative emissions of these elements are substantially small. The surface of the shield element 580 is optically disposed to emit radiation substantially towards the slit element 30. In this manner, unwanted light from outside the imaging spectrometer system 600 is blocked by the shield element 580, which only emits substantially low radiation due to the cryogenic environment of the Dewar 590. As a result, the unwanted background radiation that would otherwise be diffracted by the slit element 30 is substantially reduced.

Figure 10:
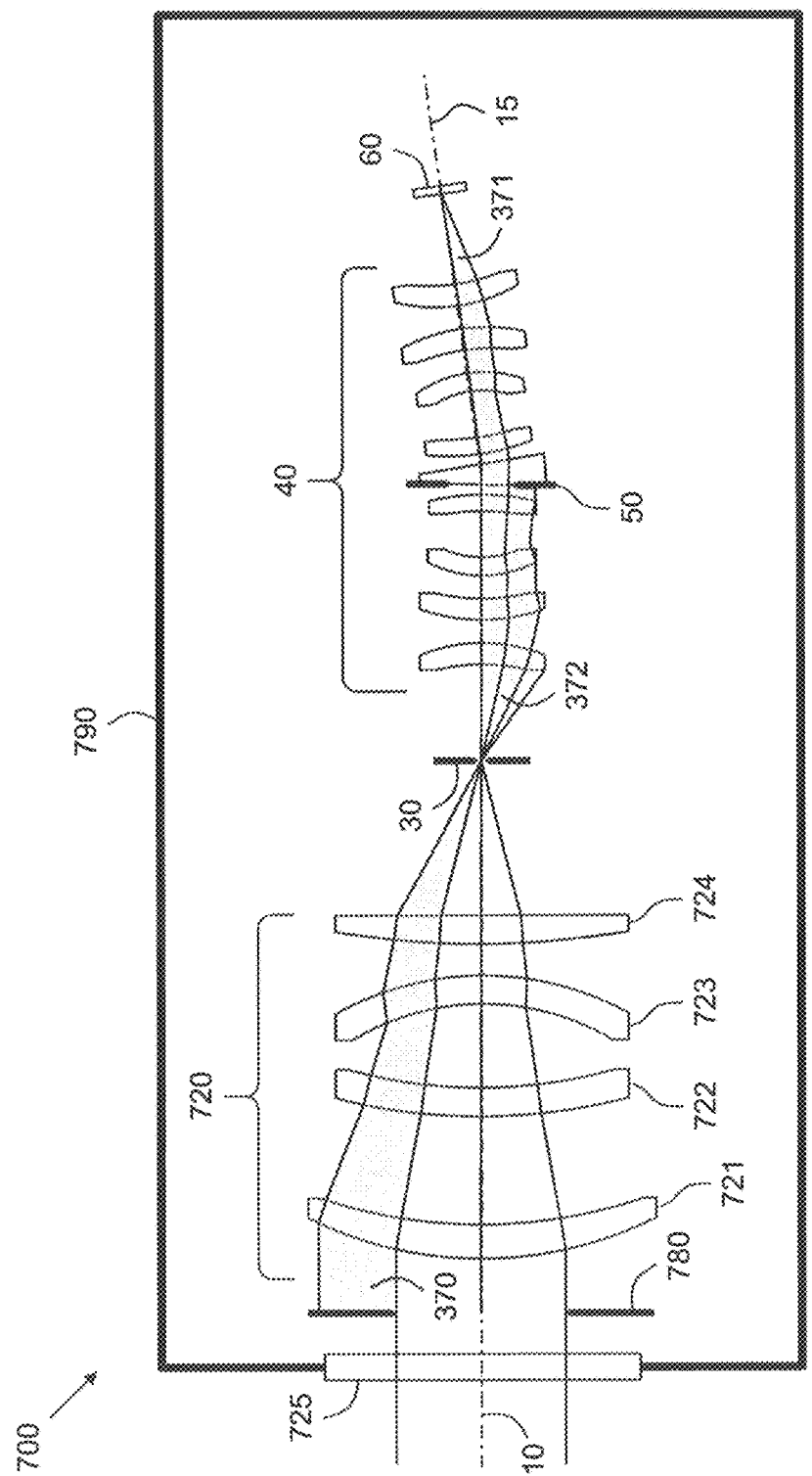
FIG. 10 is a schematic view of a further embodiment of the present teachings, taken along its optical axis in the plane parallel to the direction of dispersion.

Reference is made to FIG. 10, which is a schematic view of an embodiment of the present teachings 700 taken along its optical axes 10 and 15. In operation, light emitted or reflected by the source (not shown), is incident onto an environmental window, in this embodiment made up of, but not limited to, a refractive window 725, which is capable of substantially receiving a portion of the light from the source. The light is then incident onto an optical imaging system 720, in this embodiment made up of, but not limited to, four refractive elements 721, 722, 723, and 724, which is capable of substantially receiving a portion of the light from the environmental window 725. This light is then substantially focused onto a slit element 30, which is capable of substantially receiving the light from the optical imaging system 720. A shield element, 780, in this embodiment made up of an absorptive, or high emissivity aperture, is substantially located near an entrance or exit pupil or optical stop of the optical imaging system 720, in this embodiment located near the entrance pupil of the imaging system 720. Light emitted or reflected by the shield element 780 is substantially transmitted by the optical imaging system 720, which is capable of substantially receiving a portion of the light from the shield element 780 and then substantially focusing the light onto the slit element 30. A first portion of the light 371 from the shield element is transmitted by the slit element 30 and is substantially diffracted by slit element 30 and imaged by the optical spectrometer system 40 onto a detecting element 60, which is substantially capable of receiving a portion of the light from the optical spectrometer system 40. In this embodiment, the shield element 780, optical imaging system 720, slit element 30, optical spectrometer system 40, and detecting element 60 are located within a cryogenic environment of a Dewar 790 such that the radiative emissions of these elements are substantially small. The surface of the shield element 780 is optically disposed to emit radiation 370 substantially towards the optical imaging system 720, which is capable of substantially receiving a portion of the radiation from the shield element 780 and substantially focusing the radiation onto the slit element 30. In this manner, unwanted light from outside the imaging spectrometer system 700 is blocked by the shield element 780, which only emits substantially low radiation due to the cryogenic environment of the Dewar 790. As a result, the unwanted background radiation that would otherwise be diffracted by the slit element 30 is substantially reduced.

Figure 11:
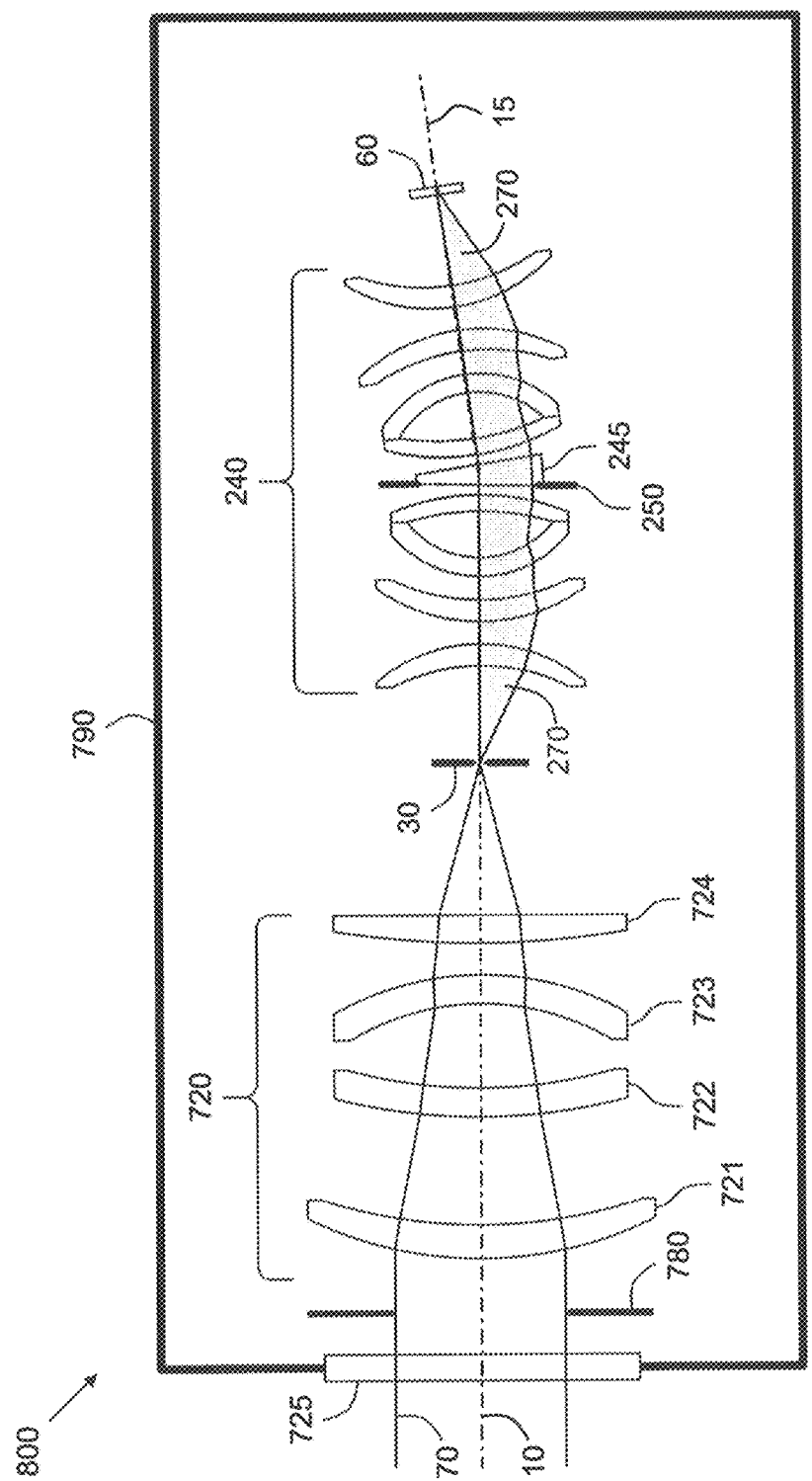
FIG. 11 is a schematic view of a still further embodiment of the present teachings, taken along its optical axis in the plane parallel to the direction of dispersion.

Reference is made to FIG. 11, which is a schematic view of an embodiment of the present teachings 800 taken along its optical axes 10 and 15. In operation, light emitted or reflected by the source (not shown), is incident onto an environmental window, in this embodiment made up of, but not limited to, a refractive window 725, which is capable of substantially receiving a portion of the light from the source. The light is then incident onto an optical imaging system 720, in this embodiment made up of, but not limited to, four refractive elements 721, 722, 723, and 724, which is capable of substantially receiving a portion of the light from the environmental window 725. This light is then substantially focused onto a slit element 30, which is capable of substantially receiving the light from the optical imaging system 720. Light transmitted by the slit element 30 is substantially diffracted by slit element 30 and imaged by the optical spectrometer system 40 onto a detecting element 60, which is substantially capable of receiving a portion of the light from the optical spectrometer system 240. The optical stop element 250 of the optical spectrometer system 240 is substantially oversized relative to the optical speed of the optical imaging system 720, such that a substantial portion of the diffracted collimated light 270 is substantially transmitted by the optical stop 250, and is then substantially imaged by the optical spectrometer system 240 onto the detecting element 60, which is substantially capable of receiving a portion of the light from the optical spectrometer system 240. The optical elements of the optical spectrometer 240 are sized appropriately to substantially transmit the portion of the diffracted light 270 that is substantially transmitted by the optical stop 250. This substantially larger transmitted portion of the diffracted light 270 results in an increase in the total throughput of the imaging spectrometer system 800 that would otherwise be lost due to diffraction of the light at the slit element 30.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the teachings. For example, although the shield element is located in a number of positions in the embodiments shown, it should be noted that the specific location of the shield element is not limited to these locations, but can in general be located anywhere, and in multiple locations, within the embodiment. Additionally, although the embodiments shown include imaging spectrometer systems, the teachings is not limited only to imaging spectrometer systems, but to any number of systems where the effects of diffraction exist, including by not limited to systems containing slits or substantially narrow apertures. Furthermore, any number of optical elements, reflective or refractive, can be used in the embodiments of the present teachings, and any aspects of the embodiments of the present teachings, including but not limited to those shown, can be used in combination with one another as still further embodiments. For example, an embodiment consisting of a shield element can be combined with an embodiment consisting of an oversized optical stop or with an embodiment consisting of an optical imaging system with oversized optical elements. In other examples, the teachings can also be applied to other refractive or reflective imaging or spectrometer designs, including but not limited to, Offner or Dyson relay and spectrometer designs.

What is claimed is:

1. An imaging optical system comprising:
   a first imaging optical sub-system having at least one optical element;
   said first imaging optical sub-system being optically disposed to receive light from a source;
   said first imaging optical sub-system having a first optical speed;
   a slit element;
   said first imaging optical sub-system being configured to substantially focus a portion of said light onto said slit element;
   said slit element being optically disposed to receive a portion of said light;
   said slit aperture being configured to substantially diffract said light;
   a second imaging optical sub-system having at least one optical element;
   said second imaging optical sub-system being optically disposed to receive a portion of diffracted light from said slit element;
   said second imaging optical sub-system having an optical stop;
   said optical stop of said second imaging optical sub-system being configured to provide a second optical speed that is larger than said first optical speed of said first optical sub-system;
   said second optical sub-system being configured to substantially focus a portion of said diffracted light to an image plane; and
   said image plane being optically disposed to receive a portion of said diffracted light.

2. The optical imaging system of claim 1 wherein at least one optical element is refractive.

3. The optical imaging system of claim 1 wherein at least one optical element is reflective.

4. The optical imaging system of claim 1 wherein said second imaging sub-system is a spectrometer.

5. An imaging optical system comprising:
   a first imaging optical sub-system having at least one optical element;
   said first imaging optical sub-system being optically disposed to receive light from a first source;
   a shield element;
   said shield element being optically disposed to block light from a second source;
   said shield element being configured to emit or reflect low amounts of light relative to said first source;
   said first imaging optical sub-system being configured to substantially focus a portion of said light onto said slit element;
   said slit element being optically disposed to receive a portion of said light;
   said slit aperture being configured to substantially diffract said light;
   a second imaging optical sub-system having at least one optical element;
   said second imaging optical sub-system being optically disposed to receive a portion of diffracted light from said slit element;
   said second optical sub-system being configured to substantially focus a portion of said diffracted light to an image plane; and
   said image plane being optically disposed to receive a portion of said diffracted light.

6. The optical imaging system of claim 5 wherein at least one optical element is refractive.

7. The optical imaging system of claim 5 wherein at least one optical element is reflective.

8. The optical imaging system of claim 5 wherein said second imaging sub-system is a spectrometer.

9. The optical imaging system of claim 5 wherein said shield element is substantially reflective.

10. The optical imaging system of claim 5 wherein said shield element is substantially emissive.

11. The optical imaging system of claim 5 wherein said shield element is optically disposed between said first source and said first imaging optical sub-system and said first optical sub-system is configured to receive a portion of said light from said shield element.

12. The optical imaging system of claim 11 wherein said shield element is substantially reflective.

13. The optical imaging system of claim 12 further comprising:
    a Dewar;
    said Dewar being configured to provide a cryogenic environment; and
    said shield element being configured to substantially reflect light emitted by said cryogenic environment to said first optical imaging sub-system.

14. The optical imaging system of claim 11 wherein said shield element is substantially emissive.

15. The optical imaging system of claim 14 further comprising:
    a Dewar;
    said Dewar being configured to provide a cryogenic environment; and
    said shield element being optically disposed within said cryogenic environment.

16. The optical imaging system of claim 5 wherein said shield element is optically disposed between said first imaging optical sub-system and said slit element.

17. The optical imaging system of claim 16 wherein said shield element is substantially reflective.

18. The optical imaging system of claim 17 further comprising:
    a Dewar;

said Dewar being configured to provide a cryogenic environment; and said shield element being configured to substantially reflect light emitted by said cryogenic environment to said first optical imaging sub-system.

19. The optical imaging system of claim 16 wherein said shield element is substantially emissive.

20. The optical imaging system of claim 19 further comprising:

a Dewar;

said Dewar being configured to provide a cryogenic environment; and said shield element being optically disposed within said cryogenic environment.

21. The optical imaging system of claim 5 wherein said second imaging optical sub-system has an optical stop configured to provide a second optical speed that is substantially larger than said first optical speed of said first optical sub-system.

22. The optical imaging system of claim 21 wherein said shield element is substantially reflective.

23. The optical imaging system of claim 22 further comprising:

a Dewar;

said Dewar being configured to provide a cryogenic environment; and said shield element being configured to substantially reflect light emitted by said cryogenic environment to said first optical imaging sub-system.

24. The optical imaging system of claim 21 wherein said shield element is substantially emissive.

25. The optical imaging system of claim 24 further comprising:

a Dewar;

said Dewar being configured to provide a cryogenic environment; and said shield element, said first optical sub-system, and said second optical sub-system being optically disposed within said cryogenic environment.

26. A method for improving throughput in sensors, the method comprising:

imaging electromagnetic radiation emanating from a source through a first optical sub-system having a first optical speed;

configuring a slit element, the slit element being configured to substantially diffract light;

imaging electromagnetic radiation diffracted by said slit element through a second optical sub-system having a second optical speed;

detecting the diffracted electromagnetic radiation with a detecting element;

wherein the second optical speed is substantially larger than said first optical speed;

wherein throughput through a sensor is improved, the sensor comprising the first and second optical sub-systems.

27. The method of claim 26 wherein the second optical sub-system is a spectrometer.

28. A method for decreasing background radiation in sensors, the method comprising:

imaging electromagnetic radiation emanating from a source through a first optical sub-system having a first optical speed;

substantially blocking background radiation outside of said first optical speed with a shield element;

wherein said shield element emits or reflects less background radiation than is blocked by said shield element;

configuring a slit element, the slit element being configured to substantially diffract light;

substantially imaging electromagnetic radiation diffracted by said slit through a second optical sub-system having a second optical speed;

detecting the diffracted electromagnetic radiation with a detecting element;

wherein background radiation in a sensor is reduced, the sensor comprising the first and second optical sub-systems.

29. The method of claim 28 wherein the second optical sub-system is a spectrometer.

30. The method of claim 29 wherein the second optical sub-system has a second optical speed that is substantially larger than said first optical speed.

* * * * *